Figure 1:
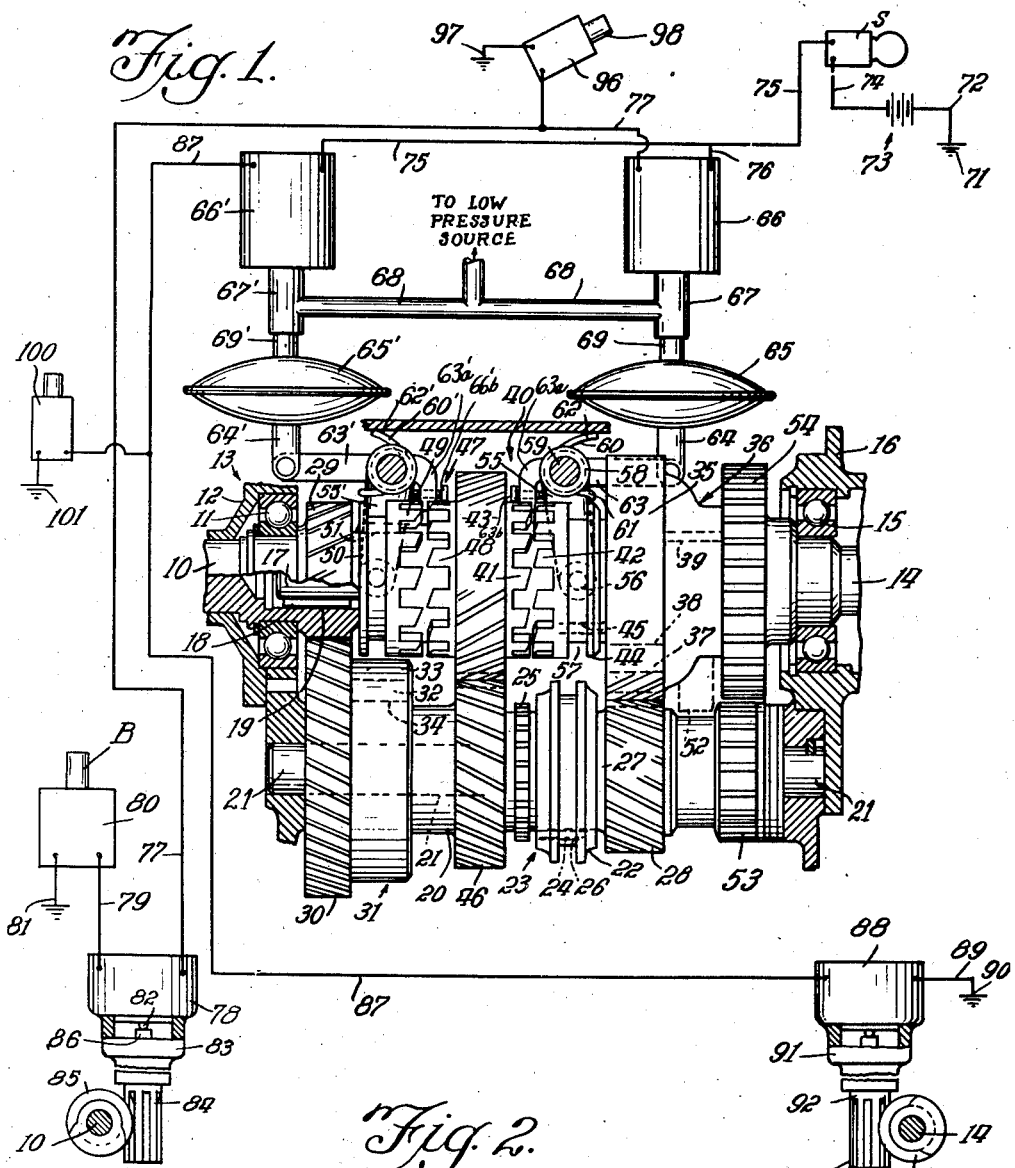

March 11, 1947.　　　O. H. BANKER　　　2,417,051

CHANGE-SPEED TRANSMISSION AND CONTROL THEREFOR

Filed Feb. 9, 1942

Inventor:
Oscar H. Banker

Patented Mar. 11, 1947

2,417,051

UNITED STATES PATENT OFFICE 2,417,051

CHANGE-SPEED TRANSMISSION AND CONTROL THEREFOR

Oscar H. Banker, Evanston, Ill., assignor to New Products Corporation, Chicago, Ill., a corporation of Delaware Application February 9, 1942, Serial No. 429,978

6 Claims. (Cl. 74—336.5)

1

This invention relates to a new change-speed transmission unit embodying a novel speed-responsive system in control of power train selection, rendering the unit particularly useful between the engine and propelling means of engine-driven vehicles, though not limiting the invention to such field.

An important general object of the invention is the provision of an improved means responsive to functions in speed of both the drive and driven members in a change-speed transmission to determine which power trains shall become operative when shift in trains or certain conditions precedent to a shift are executed.

Another object of the invention is the provision of a change-speed unit having a plurality of power trains selectively connectible in driving relation between drive and driven members by the disposition of a pair of clutches in various combinations with respect to their being opened or closed, there being speed-responsive means operable to cause closing of one of said clutches when the drive member exceeds a predetermined speed and another speed-responsive means operable to cause closing of the other clutch when the driven member exceeds a predetermined speed.

Another object is the provision in a change-speed transmission having overrunning power trains graduated in speed ratio and connectible in operative relation between drive and driven members by the synchronization and meshing of intermeshable members respectively pertaining thereto upon decrease in the drive member speed relatively to that of the driven member in amounts corresponding to the difference in the speed ratios of the trains between which a shift is made, of speed-responsive means operable only above a predetermined drive member speed to enable the connection of a lower ratio train, speed-responsive means operable only above a predetermined driven member speed to enable the connection of an intermediate ratio train, and both of said speed responsive means being operable to enable connection of a higher ratio train only when both of said drive and driven members are rotating at or above their aforesaid predetermined speeds.

Another object is the provision in a change-speed unit having overrunning lower and intermediate ratio power trains from the lower of which a shift is executable either into the intermediate train or into a higher ratio train which includes disrupting means operable to disrupt such train, of a clutch common to the inter-

2 mediate and higher ratio trains, speed responsive means operable when the transmission driven member attains a predetermined minimum speed, upon said shift execution, to close said common clutch, and speed-responsive means operable below a predetermined speed of the transmission drive member to cause operation of said disrupting means whereby the intermediate train is connected instead of the higher ratio train.

Still another object is the provision of a change-speed unit according to the next preceding object and wherein said disrupting means for the higher ratio train is a clutch comprising part of the lower ratio train.

A further object is the provision of a change-speed unit operable with a higher ratio power train between drive and driven members while overrunning intermediate and lower ratio trains remain mobilized for successive operation respectively upon the opening of a first clutch in the higher ratio train and the subsequent opening of a second clutch in the intermediate train, speed-responsive means for causing opening of the first clutch when the drive member drops below a predetermined speed, and an additional speed responsive means for causing opening of the second clutch when the driven shaft drops predeterminedly below the speed of its operation when, during operation of the higher ratio train, the drive member drops to its aforesaid predetermined speed.

Figure 2:
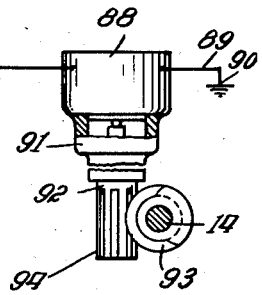

These and other desirable objects inherent in and encompassed by the invention will be better understood from the ensuing description together with the annexed drawing showing a preferred embodiment and wherein:

Fig. 1 is a side elevational view, partly in section, of a change-speed unit constructed according to the principles of the present invention; and Fig. 2 is a chart illustrating the speed ranges in which the various power trains are establishable and operable.

The transmission unit embodying a preferred form of the invention, shown in Fig. 1, comprises a drive shaft 10 journalled within a bearing unit 11 in the front wall 12 of a gear box 13, a coaxial driven shaft 14 journalled within a bearing unit 15 supported in the rear wall 16 of the gear box. The driven shaft 14 also has a front end bearing portion 17 of reduced diameter piloted upon a set of needle bearings 18 within a bearing cavity 19 in the back end of the drive shaft. A countershaft 20 is suitably journalled upon a countershaft bearing rod 21 fixed at its opposite ends in the front and back walls of the gear box.

The drive shaft 10 is normally driven clockwise as viewed from the front or left end and the gearing associated with the transmission shifting is adapted to be connected between the drive and driven shafts in such different combinations as to effect four forward drive power trains of different speed ratio in each of which the driven shaft 14 is rotated in the same direction as the drive shaft. One reverse power train of speed reduction ratio is also establishable between the drive and driven shafts.

Hereafter the use of the terms "clockwise" and "counter-clockwise" will be with reference from a viewing point forwardly of the gearing, unless otherwise specified.

The first speed power train is established by shifting a ring 22 of a jaw clutch 23 forwardly and to mesh its internal teeth 24 with the teeth 25 on the countershaft 20 while leaving portions of such teeth 24 meshed with teeth 26 on a sleeve 27 having a gear 28 integral therewith. The drive will then be from a drive shaft gear 29 through a countershaft gear 30, an overrunning clutch unit 31 embodying clutch rollers 32 between a ring 33 and a clutch actuator member 34 of any conventional structure, the countershaft 20, clutch 23, gear 28, a gear 35, an overrunning clutch unit 36 including clutch rollers 37 disposed between an inner peripheral portion of the gear 35 and a clutch actuator member 38 splined at 39 to the driven shaft 14.

The second speed power train is established by closing the rear jaw clutch 40 by the meshing of toothed counterparts 41 and 42 thereof which are respectively upon a gear 43 which is journalled upon the driven shaft 14 and upon a shifter ring 44 splined at 45 to the driven shaft. The clutch 40 is closed by shifting the ring 44 forwardly. In second speed the drive is from the gear 29 through gear 30, overrunning clutch 31, countershaft 20, a gear 46 integral with the countershaft, said gear 43, clutch 40 and the shifter ring 44 to the driven shaft. During operation of the second speed train the gears 46 and 43 rotate the driven shaft and hence the clutch actuator member 38 at an overspeed with respect to the gear 35, as permitted by the clutch rollers 37.

Third speed is obtained by opening the clutch 40 and closing a jaw clutch 47. This clutch includes a toothed counterpart 48 upon the front end of the gear 43 and a toothed counterpart 49 upon a shifter ring 50 splined at 51 upon the back end of the drive shaft 10. This clutch is closed when the shifter ring 50 is slid backwardly, meshing the toothed counterparts 48 and 49. Power is transmitted from the drive shaft through the clutch 47. gears 43 and 46, clutch 23, gears 28 and 35, and the overrunning clutch 36 to the driven shaft. Meanwhile the gear 46 and the countershaft 20 will be rotated at greater speed than the gear 30 whereby the clutch 31 overruns.

Fourth speed is incurred by closing both of the clutches 40 and 47, whereupon power will be transmitted from the drive shaft 10 through the clutch 47, the hub of gear 43, clutch 40 and the shifter ring 44 to the driven shaft, the driven shaft thus being driven at the same speed as the drive shaft.

The reverse power train is established between the drive and driven shafts by opening the clutch 23 and thereafter shifting a reverse idler gear 52 rearwardly into mutual mesh with a reverse gear 53 rotatably fixed on the countershaft and a reverse gear 54 rotatably fixed on the driven shaft. Any manual control means, as that illustrated in my copending application Serial No. 357,388, filed September 19, 1940, for Automatic change-speed transmission, may be employed for shifting the clutch ring 22 and the reverse idler gear 52 in the manner just described.

A shifter fork 55 having pins 56 in its depending legs disposed within diametrically opposite portions of a groove 57 in the clutch ring 44 is employed for controlling the axial shifting of this ring. The hub 58 of this shifter fork is journalled upon a cross shaft 59 which in turn is suitably journalled in the gear box, and a spring 60 wrapped about said shifter fork hub constantly urges the same to rotate clockwise as viewed in Fig. 1 for closing the clutch 40. Such action of the spring 60 is obtained by having the end 61 thereof hooked about one leg of the shifter fork and its opposite end 62 bearing reactively against a portion of the gear box. An arm 63 fixed upon the journalled shaft 59 is connected by a link 64 with a vacuum motor 65 controlled by a solenoid 66 which, when energized, actuates its core (not shown) for opening a valve 67 through which communication is then had by conduits 68 and 69 for operably connecting the motor 65 with a source of low pressure such as the intake manifold of a vehicle engine. The valve 67 may be of the general type shown in my Patent No. 2,171,534, excepting that it is operated by the armature of the solenoid 66 instead of being manually operated. When the motor 65 is subjected to the influence of the low pressure source by the opening of the valve 67 upon energization of the solenoid 66, the link 64 will be lifted by the motor, causing counter-clockwise rotation of the arm 63, the shaft 59, a second arm, 63a, which is non-rotatively fixed upon said shaft, and hence the shifter fork 55 to open the clutch 40 or maintain the same open. A threaded stud 63b adjustably secured in the arm 63a abuts against the fork 55 to cause such rotation of the latter against the force of the spring 60 during said counter-clockwise rotation of the cross shaft 59. Upon deenergization of the solenoid 66 the valve 67 terminates communication between the conduits 68 and 69 and provides communication between the conduit 69 and the atmosphere whereby the motor 65 is deenergized to leave the clutch 40 subjected to the influence of the spring 60 which will then close the clutch 40 or place the end faces of the teeth upon the counterparts 41 and 42 in abutting relation according to whether these counterparts are synchronized and in the relative rotated relation for meshing or not.

Control of the clutch 47 is had by parts corresponding in every respect to those just described with respect to the clutch 40 wherefore these parts are simply designated by the same respective reference characters with a prime added as an expedient to this description. It will be explained, however, that the spring 60' is wrapped about the hub of the shifter fork 55' in such a direction as to urge this shifter fork to rotate counter-clockwise as viewed in Fig. 1 instead of clockwise, wherefore said spring 60' biases the clutch 47 toward closed position. Although I prefer to employ relatively small solenoids 66 and 66' for controlling the motors 65 and 65' in manipulating the clutches 40 and 47, it should be understood that these solenoids could be designed to use their own power for operating said clutches, in which event their armatures would be connected with the arms 63 and 63' instead of with the valves 67 and 67'.

Energization of the solenoid 66 is effected by an electric circuit starting with ground indicated at 71 in the upper right-hand part of Fig. 1 and including a conductor 72, an electric energy source 73, a conductor 74, contacts not shown but operable to connect the conductor 74 with a conductor 75 when a switch S, as the ignition switch for the engine of a motor vehicle, is closed, conductor 76, the solenoid 66, a conductor 77, a normally closed governor actuated switch 78, conductor 79, and a normally closed manually operable switch 80 back to ground at 81. The switch 78 has an operating stem 82 which when pressed upwardly opens contacts (not shown) for electrically connecting the conductors 77 and 79. A governor 83 having a shaft 84 driven from the drive shaft 10 through a worm pinion 85 is operable when registering speeds of the drive shaft above a predetermined minimum to move a plunger 86 against the switch operating stem 82 for opening the contacts in the switch 78; and when the speed of the drive shaft drops below a predetermined minimum the plunger 86 will be retracted downwardly to permit closing of the switch contacts. While I here show the shaft 84 of the speed-responsive means driven directly from the transmission drive shaft 10, it will be understood that the shaft 84 may be driven from any engine-driven part, rotating as a function of the speed of said drive shaft.

A circuit for energizing the solenoid 66' also includes the conductor 75, said solenoid 66', a conductor 87 and a governor control switch 88 and a conductor 89 leading to ground at 90. The switch 88 is like the switch 78 and is driven by a governor unit 91 corresponding to the governor unit 83 but of which the operating shaft 92 is driven as a function of the transmission driven shaft 14 through gearing as a worm pinion 93 fixed upon the shaft 14 and meshing with a worm gear portion 94 of the shaft 92. The switch 88 is also normally closed but openable by the governor 91 when the driven shaft 14 exceeds a predetermined speed.

When the present unit is installed upon a motor vehicle having engine ignition switch S, and such switch is closed preparatory to operating the vehicle, each of the solenoids 66 and 66' will be energized for opening the clutches 46 and 47. Solenoid 66 energizes because of the connecting of the conductors 74 and 75 electrically together upon the closing of the switch S, the circuit continuing through the solenoid 66, conductor 77, the switch 78 which is then closed because the governor 83 is then driven at zero speed, conductor 79 and the normally closed manually operable switch 80 to ground completing the circuit. Since the driven shaft 14 is then at rest the governor 91 is quiescent, leaving the switch 88 closed wherefore the circuit for energizing the solenoid 66' is completed therethrough from the conductor 75, the conductor 87, the switch 88 and conductor 89 to ground at 90. The operator of the vehicle may then select whether the vehicle shall be started forwardly or rearwardly by engaging the clutch 23 or by sliding the reverse idler gear 52 into mesh with the reverse gears 53 and 54.

A typical operation of the present unit under control of the speed responsive devices 83 and 91 will be explained with reference to the chart in Fig. 2. It will be assumed the drive shaft governor 83 "actuates" to cause opening of the switch 78 when the drive shaft reaches 1000 R. P. M. and that it "releases" to cause closing of said switch at 900 R. P. M. The driven shaft governor 91 is assumed to "actuate" to cause opening of the switch 88 when the driven shaft reaches 750 R. P. M. and to "release" for causing said switch to open when the driven shaft drops to 300 R. P. M. It will be further assumed that at a vehicular speed of 10 M. P. H. the driven shaft rotates at 425 R. P. M. as does the drive shaft if the fourth speed train is connected. This condition is indicated by the numerical notation 425 in the fourth speed column of the chart and opposite the 10 M. P. H. notations in the M. P. H. columns at the right and left ends of the chart. The speed ratios of the transmission power trains are assumed to be such that should the transmission be operating in first (while the vehicle is driven at 10 M. P. H.) the drive shaft rotates at 1202 R. P. M.; that with the second speed train in operation the drive shaft rotates at 882 R. P. M.; and that with the third speed train in operation the drive shaft rotates at 579 R. P. M. These speed notations 1202, 882 and 579 are shown in the chart respectively in the first speed, second speed and third speed columns at the 10 M. P. H. elevation. The chart also has corresponding R. P. M. notations in all four columns for vehicular speeds of 15, 20 and 25 M. P. H., as well as for other vehicular speeds referred to more particularly hereinafter.

Assuming the first speed train to be in operation, the shift into second will involve closing the rear jaw clutch wherefor a vehicular speed must be attained at which the drive shaft governor will be rotating at at least 900 R. P. M. when the engine slows down to synchronizing speed for making the second speed connection. This vehicular speed is found to be 10.08 M. P. H., so that while operating in first, say at 15 M. P. H., when the drive shaft has exceeded its "actuation" speed of 1000 R. P. M. for the governor and is still above the "release" speed of 900 R. P. M., the shift can be made into second for the solenoid 66 will be deenergized permitting the spring 60 to place the clutch 40 in ratcheting relation preparatory to meshing when the drive shaft slows down sufficiently to synchronize the counterpart 41 with the counterpart 42. The speed range between limits of 10.08 M. P. H. and 17.6 M. P. H. wherein a shift may be executed into second by momentary release of the accelerator pedal is termed the 15 M. P. H. range and illustrated graphically by the vertical band of arrows pointing into the second speed chart column from the first speed column.

A shift from second to third involves opening the rear clutch 40 and closing the forward clutch 47, so that the vehicular speed range in which the shift is made into the third speed connection will be such that the driven shaft governor will be "actuated" and the drive shaft must slow down to such a speed in synchronizing the forward clutch that the drive shaft governor will first "release," closing the switch 78 for energizing the solenoid 66 and thus causing the rear clutch to open. "Actuation" of the driven shaft governor at 750 R. P. M. determines a vehicular speed limit that must be attained or exceeded before a shift can be made into third, although once this speed is reached the shift may be executed at a vehicular speed as low as 7.06 M. P. H. at which the driven shaft governor "releases," this corresponding to the aforesaid 300 R. P. M. of the driven shaft. The upper vehicular speed limit for shifting into third is 21.15 M. P. H. above which the drive shaft would be rotating sufficiently fast (above the "release" speed of 900 R. P. M.) when decelerated for causing closing of the clutch 47, to permit the clutch 40 to remain closed whereby fourth speed would be established instead of third. The entire speed range of 7.06 M. P. H. to 21.15 wherein a shift may be executed into third speed, following a vehicular speed of 17.6 M. P. H., is graphically indicated by a vertical band of arrows, both long and short, pointing into the third speed chart column from its left edge. That part of this speed range indicated by the long arrows is the part normally used on a shift-up into third and is termed the 20 M. P. H. range since the round number 20 M. P. H. falls therein. The narrow or short arrow part of this speed designating band pertains to an operating range in which it is desired for the third speed train to remain connected should the vehicle be but temporarily decelerated.

A shift into fourth is possible any time above a vehicular speed of 21.15 M. P. H. say 25 M. P. H., at which time both governors will be "actuated" and each clutch is synchronizable while the drive and driven shafts are rotating above their governor "releasing" speeds of 900 R. P. M. and 300 R. P. M. The speed range extending up from 21.15 M. P. H. is termed the 25 M. P. H. range since such value falls within the range and is thought to be the round number mean of speeds at which shifts into fourth will be executed.

While operating in fourth, a shift down into third will automatically occur at 21.15 M. P. H. at which time the drive shaft governor 83 will "release," it then registering a drive shaft speed of 900, whereupon the switch 78 is closed and the solenoid 66 energized for causing opening of the clutch 40. Further decrease in vehicular speed will not cause disestablishment of the third speed connection until 7.06 M. P. H. is reached when the driven shaft reaches 300 R. P. M. causing "release" of the driven shaft governor and consequent opening of the forward clutch 47. Acceleration of the drive shaft would then result in the transmission of power through the first speed train, both clutches 40 and 47 then being open.

There may be times while operating the transmission unit in the second or fourth speed power trains when it is desirable that "releasing" of the drive shaft governor 83 shall not cause energization of the solenoid 66 and the consequent disengagement of the rear clutch 40 for disrupting the power train then in operation. In other words, referring to the second speed and fourth speed columns in the chart of Fig. 2, it might be desired to hold the second speed train in operation at vehicular speeds of less than 10.08 M. P. H. and likewise to hold the fourth speed train in operation below vehicular speeds of 21.15 M. P. H. Such control of the transmission unit is made possible by virtue of the manually operable switch 80 which, when the operating button B thereof is pressed, breaks the energization circuit for the solenoid 66 independently of the governor actuated switch 78. The switch 80 may be placed in convenient reach of a vehicle operator's foot upon the floor board of the operator's compartment or within convenient hand reach as upon the vehicle dash.

Another control is provided for manually disrupting the fourth or second speed power trains at will irrespective of vehicle speed. This control comprises a "kick-down" switch 96 connected between the conductor 77 and ground at 97. When the switch 96 is closed by pressing inwardly upon an operating button 98 a circuit will be closed from the ungrounded side of the electric energy source 73 through the conductor 74, switch contacts controlled with the ignition switch S, conductors 75 and 76, solenoid 66, conductor 77, and said switch 96 to ground. Closing of the "kick-down" switch 96 therefore causes energization of the solenoid 66 and the consequent opening of the clutch 40. Should the transmission unit be operating in the fourth speed connection at the time of operating the "kick-down" switch the shift will be into third speed, and should the transmission unit be operating in the second speed connection at the time of such operation of the "kick-down" switch the shift will be downwardly into the first speed connection.

A manually operated "kick-down" switch, 100, similar to the switch 96 is connected between the conductor 87 and ground at 101. This switch is also normally open, but when closed it is operable to cause energization of the solenoid 66' and consequent opening of the clutch 47 to immediately establish second speed from fourth or first speed from third.

The operation of the herein illustrated embodiment of the invention has been explained with the assumption of particular speed transmission ratio for the respective power trains and particular "actuating" and "release" speeds for the governors 83 and 91. With these specific assumptions particular operating characteristics are attained that are shown graphically in Fig. 2 and which have been described with reference to that figure. It is contemplated, however, that changes may be made in the arrangement of power trains and in their speed ratios and also in the "actuating" and "release" speeds of the governors.

While I have herein shown and described a preferred embodiment with the view of fully illustrating the invention, it should be understood that the invention extends to other forms, arrangements, structures, and details falling within the scope and spirit thereof and not sacrificing all of its material advantages.

I claim:

1. In a change-speed transmission having a plurality of power trains of different speed transmitting ratio and a pair of clutches operable in different combinations with respect to their being opened or closed to determine which of said power trains is connected in driving relation between drive and driven members said clutches being of the synchronise jaw type including drive and driven jaw components meshable to close their clutch upon deceleration of the drive component thereof to synchronism with the driven component thereof, the combination of clutch actuating means conditionable to become operable for closing one of said clutches upon its components attaining synchronism, a second clutch actuating means conditionable to become operable for closing the other of said clutches upon its components attaining synchronism, speed-responsive means operable according to the speed of the drive member for so conditioning one of the clutch actuating means, and speed-responsive means normally continuously operable according to the speed of the driven member for initially so conditioning the other clutch actuating means at driven shaft speeds only in excess of those attained when connected with the drive shaft through lower of such speed connections while the drive shaft speed responsive means becomes operable to condition its associated clutch actuating means.

2. In a change-speed transmission having power trains of relatively lower, intermediate and higher speeds connectible between drive and driven members incident to incurring relatively faster, intermediate and slower speed of the drive member with respect to the driven member while power is transmitted thereby between said members, a first clutch necessarily engaged for the establishment of the higher speed train, and a second clutch engageable to so establish said higher speed train incident to a shift-up from the lower speed train while the first clutch is engaged or to establish the intermediate speed train when engaged while the first clutch is disengaged; the combination of drive member speed-responsive means operable as a function of the drive member speed, driven member speed-responsive means operable as a function of the driven member speed, clutch actuating means under control of the driven member speed-responsive means and operable in the execution of a shift-up from the lower ratio train, when such speed-responsive means registers driven member speeds above a predetermined minimum, to cause engagement of the second clutch, and clutch actuating means under control of the drive member speed-responsive means and operable in the execution of said shift-up, when such speed-responsive means registers drive member speeds above a predetermined minimum, to cause engagement of the first clutch whereby the higher speed train is established, and said last named clutch actuating means being operable when registering drive member speeds below such minimum to cause disengagement of said first clutch and consequent establishment of the intermediate ratio train instead of the higher ratio train in the execution of said shift-up.

3. In a change-speed transmission having power trains of relatively lower, intermediate and higher speeds connectible between drive and driven members incident to incurring relatively faster, intermediate and slower speed of the drive member with respect to the driven member while power is transmitted thereby between said members, and a clutch common to the intermediate and higher speed trains in the respect that it is transmitive of force in each of such trains, said clutch including drive and driven components respectively rotatable according to the speeds of the drive and driven members and meshable when synchronized to mobilize the higher speed train providing the latter is not disrupted or to mobilize the intermediate train should the higher speed train be disrupted; the combination of drive member speed-responsive means operable as a function of the drive member speed, driven member speed-responsive means operable as a function of the driven member speed, means operable incident to the execution of a shift-up from the lower speed train and under control of said driven member speed-responsive means to cause meshing of said clutch components while the driven member speed-responsive means registers speeds in excess of a predetermined minimum and upon deceleration of the drive member to synchronize the clutch components, and means operable incident to such shift-up and under control of the drive member speed-responsive means to cause disruption of the higher speed train and consequential establishment of the intermediate speed train by the meshing of said clutch components should the driven member speed be so low that the drive member falls below a predetermined minimum in effecting said synchronism of the clutch components.

4. In a change-speed transmission having relatively lower and intermediate overrunning speed transmission power trains operable between drive and driven members and from the lower of which trains a shift-up is executable either into the intermediate speed train or into a higher speed train by bringing about deceleration of the drive member relatively to the driven member; the combination of power train disrupting means operable to disrupt the higher speed train, a clutch common to the intermediate and higher speed trains in the respect that it is transmitive of force in each of such trains, said clutch including drive and driven components respectively rotatable as functions of the drive and driven member speeds during operation of the lower speed train and meshable when synchronized to operably connect the higher speed train between said members when the latter power train is not disrupted by said disrupting means and to operably connect the intermediate speed train between said members when the higher speed train is so disrupted, drive member speed-responsive means, driven member speed-responsive means, meshing means for said clutch, said driven member speed-responsive means being in control of said clutch meshing means and being operable when the driven member attains a speed suitable for connection of the intermediate speed train to effect meshing of said clutch counterparts upon their synchronization brought about by deceleration of the drive member, the drive member speed-responsive means being in control of said power train disrupting means and being operable to cause operation of said disrupting means when said drive member, in synchronizing said clutch components, decelerates to a speed below which it is undesired to employ the higher speed train between said drive and driven members.

5. In a change-speed transmission having relatively lower and intermediate overrunning speed transmission power trains operable between drive and driven members and from the lower of which trains a shift-up is executable either into the intermediate speed train or into a higher speed transmission train by bringing about deceleration of the drive member relatively to the driven member; the combination of a first clutch common to said lower and higher speed trains and operable to contribute to the establishment of one thereof when closed, said clutch including drive and driven components respectively rotatable as functions of the drive and driven shaft speeds when the clutch is open and meshable to become closed when synchronized, a second clutch common to said intermediate and higher ratio trains in the respect that it is transmitive of force in each of such trains, said second clutch including drive and driven components respectively rotatable as functions of the drive and driven member speeds during operation of said lower speed train and meshable when synchronized to close and thus operably connect the higher speed train between said members when the first clutch is closed or to operably connect the intermediate speed train between said members when the first clutch is open, clutch actuating means operable to mesh and demesh said clutches, drive member speed-responsive means operable to cause actuation of said clutch operating means, when the driven member is rotating at a speed suitable for connection of the lower speed train, to close the first clutch upon synchronization of its counterparts brought about by deceleration of the drive member, driven member speed-responsive means operable to cause actuation of said clutch operating means, when the driven member exceeds a predetermined greater speed, to close the second clutch upon synchronization of its counterparts brought about by deceleration of the drive member, such closing of the second clutch effecting establishment of the higher speed train when the first clutch remains closed, but the drive shaft speed-responsive means being operable to cause actuation of said clutch operating means for opening the first clutch prior to closing of the second clutch and consequent establishment of the intermediate speed train by said closing of the second clutch should such greater speed of the driven member be so low that the drive member falls below a predetermined speed in effecting said synchronism of the second clutch counterparts.

6. In a change-speed transmission, drive and driven members, relatively higher and lower speed power trains drivably connectible between said members and of which trains each includes a disrupting means operable to disrupt the same, the lower speed train being overrunning to remain mobilized preparatory to becoming drivingly connected upon disruption of the higher speed train, means operable according to the drive member speed to operate the higher speed train disrupting means during operation of such train when the drive member drops below a predetermined speed, and means operable according to the driven member speed to operate the lower speed train disrupting means during operation of such train when the driven shaft drops predeterminedly below the speed at which it would be driven during operation of the higher speed train at the instant of its disruption by the aforesaid operation of the means operable according to the drive member speed.

OSCAR H. BANKER.

REFERENCES CITED

The following references are of record in the file of this patent:

UNITED STATES PATENTS

| Number | Name | Date |
|---|---|---|
| 2,136,811 | Burtnett | Nov. 15, 1938 |
| 2,193,267 | Burtnett | Mar. 12, 1940 |
| 2,247,478 | Burtnett | July 1, 1941 |
| 2,073,264 | McDonald | Mar. 9, 1937 |
| 2,202,378 | Hertrich | May 28, 1940 |
| 2,102,781 | Bieretz | Dec. 21, 1937 |
| 2,076,791 | Platt | Apr. 13, 1937 |
| 1,993,454 | Paterson et al. | Mar. 5, 1935 |
| 2,223,716 | Bojesen | Dec. 3, 1940 |
| 2,257,333 | Cotterman | Sept. 30, 1941 |
| 2,262,747 | Banker | Nov. 18, 1941 |
| 2,086,600 | Burtnett | July 13, 1937 |
| 2,205,832 | Henriod, Fils | June 25, 1940 |
| 2,218,813 | Cotterman | Oct. 22, 1940 |